US008020883B2

(12) United States Patent
Brusca

(10) Patent No.: US 8,020,883 B2
(45) Date of Patent: Sep. 20, 2011

(54) LOGICAL THIRD AXLE BICYCLE GEAR TRAIN

(75) Inventor: Victor G. Brusca, Elizabeth, NJ (US)

(73) Assignee: Jensen and Brusca Consulting Group, New Brunswick, NJ (US)

( * ) Notice: Subject to any disclaimer, the term of this patent is extended or adjusted under 35 U.S.C. 154(b) by 283 days.

(21) Appl. No.: 12/397,709

(22) Filed: Mar. 4, 2009

(65) Prior Publication Data
US 2010/0225087 A1    Sep. 9, 2010

(51) Int. Cl.
*B62M 11/02* (2006.01)
(52) U.S. Cl. .................................. 280/260; 280/261
(58) Field of Classification Search .................. 280/259, 280/260, 261
See application file for complete search history.

(56) References Cited

U.S. PATENT DOCUMENTS

| | | | |
|---|---|---|---|
| 194,980 A * | 9/1877 | Whitehead | 475/230 |
| 242,310 A * | 5/1881 | Harrison | 74/421 R |
| 443,482 A * | 12/1890 | Hunt | 280/260 |
| 477,292 A * | 6/1892 | Bradley | 280/260 |
| 607,522 A * | 7/1898 | Noyes | 280/260 |
| 611,865 A * | 10/1898 | Parker | 280/260 |
| 615,137 A * | 11/1898 | Caddick | 280/260 |
| 616,665 A * | 12/1898 | Hartzell | 74/67 |
| 1,332,709 A * | 3/1920 | Chrobak | 280/260 |
| 2,378,634 A | 6/1945 | Hussey | |
| 2,827,797 A | 7/1954 | Bell et al. | |
| 2,687,897 A * | 8/1954 | Wells | 280/260 |
| 3,121,575 A | 2/1964 | Bourgi | |
| 3,259,395 A | 7/1966 | Blair | |
| 3,759,543 A | 9/1973 | Clark | |
| 3,779,099 A | 12/1973 | Trammel | |
| 3,881,747 A | 5/1975 | Abbott | |
| 3,891,235 A | 6/1975 | Shelly | |
| 3,912,039 A | 10/1975 | Ordemann | |
| 3,998,469 A | 12/1976 | Ruys | |
| 4,029,334 A | 6/1977 | Trammell | |
| 4,062,421 A | 12/1977 | Weber | |
| 4,133,550 A | 1/1979 | Brown | |
| 4,169,609 A | 10/1979 | Zempedro | |
| 4,173,154 A | 11/1979 | Sawmiller et al. | |
| 4,281,845 A | 8/1981 | Brown | |
| 4,283,069 A | 8/1981 | Citelli | |
| 4,290,621 A | 9/1981 | Davey | |
| 4,447,068 A | 5/1984 | Brooks | |
| 4,456,276 A | 6/1984 | Bortolin | |
| 4,598,920 A | 7/1986 | Dutil et al. | |
| 4,782,722 A | 11/1988 | Powell | |
| 5,002,296 A * | 3/1991 | Chiu | 280/260 |
| 5,136,892 A | 8/1992 | Ochs | |
| 5,236,211 A | 8/1993 | Meguerditchian | |
| 5,426,997 A | 6/1995 | Brion | |
| 5,442,972 A | 8/1995 | Hoover | |
| 5,590,894 A | 1/1997 | Wen | |
| 5,738,197 A | 4/1998 | Kroger et al. | |

(Continued)

*Primary Examiner* — Kevin Hurley
(74) *Attorney, Agent, or Firm* — Weitzman Law Offices, LLC

(57) ABSTRACT

A logical third axle gear train for a bicycle, comprising a power gear operatively connected to at least one sprocket and adapted to be rotatably mounted on a bicycle frame. A drive gear is operatively connected to a hub assembly on which a drive wheel is mounted. A conversion gear adapted to be rotatably mounted on the bicycle frame is disposed between the power gear and drive gear to transmit torque from the power gear to drive gear. The drive wheel is removable from the bicycle frame without manipulation of a chain for driving the sprocket.

16 Claims, 2 Drawing Sheets

U.S. PATENT DOCUMENTS

| | | |
|---|---|---|
| 5,961,424 A | 10/1999 | Warner et al. |
| 5,979,924 A | 11/1999 | D'Aluisio et al. |
| 5,983,751 A | 11/1999 | DeCloux |
| 6,394,477 B1 | 5/2002 | Cellini |
| 2008/0081716 A1 | 4/2008 | Watarai et al. |

* cited by examiner

LOGICAL THIRD AXLE BICYCLE GEAR TRAIN

BACKGROUND

1. Field of the Invention

This disclosure relates generally to gear trains, and, more particularly, to a logical third axle bicycle gear train for use with a detachable bicycle drive wheel.

2. Description of Related Art

Modern bicycles typically use a chain driven mechanism to transmit torque generated by the rider to the rear wheel of the bicycle. The bicycle operator places his feet on pedals, which are pivotally connected to crank arms. The crank arms are fastened to a crank core, which forms the center of a crank-core/crank-sprocket assembly. The crank sprocket drives a continuous drive chain, which transmits torque to a rear drive sprocket. The rear drive sprocket is connected to the rear drive wheel via a bicycle hub assembly, which typically includes a hub shell. The hub shell connects both the drive wheel and drive sprocket. The application of torque to the rear drive sprocket causes the hub shell to rotate on bearings internal to the hub assembly. In turn, rotation of the hub shell causes the rear drive wheel to rotate, propelling the bicycle forward.

Notwithstanding its prevalent use on bicycles, this configuration proves troublesome when removal of the rear wheel is required, because the rear drive sprocket is mounted on the same axle as the rear wheel. The drive chain must, therefore, be removed from the sprocket in order to free the rear wheel from the bicycle. This, in turn, requires slackening the drive chain by shifting into the lowest bicycle gear and manipulating the rear derailleur on the bicycle.

It is, therefore, desirable to enable removal of the rear bicycle drive wheel without requiring manipulation/removal of the bicycle drive chain.

BRIEF SUMMARY

In one aspect of this disclosure, a logical third axle gear train for a bicycle is disclosed, comprising a power gear operatively connected to at least one sprocket and adapted to be rotatably mounted on a bicycle frame. A drive gear is operatively connected to a hub assembly on which a drive wheel is mounted. A conversion gear adapted to be rotatably mounted on the bicycle frame is disposed between the power gear and drive gear to transmit torque from the power gear to drive gear. The drive wheel is removable from the bicycle frame without manipulation of a chain for driving the sprocket.

In another aspect of this disclosure, a bicycle is disclosed having a logical third axle gear train. The bicycle comprising a bicycle frame and a drive gear operatively connected to a hub assembly on which a drive wheel is mounted, the hub assembly being releasably attached to the bicycle frame. A power gear is rotatably mounted on the bicycle frame and operatively connected to at least one sprocket driven by a chain. A conversion gear is disposed between the power gear and drive gear, wherein the drive wheel, hub assembly and power gear are removable from the bicycle frame without manipulation of the chain.

In another aspect of this disclosure, a method of removing a bicycle wheel from a bicycle frame is disclosed. The method comprises rotatably mounting a power gear on the bicycle frame and operatively connecting the power gear to at least one sprocket driven by a chain. A drive gear is operatively connected to a hub assembly on which the bicycle wheel is mounted, the hub assembly being releasably mounted on the bicycle frame. A conversion gear is rotatably mounted on the bicycle frame between the power gear and drive gear for transmitting torque from the power gear to drive gear. The drive wheel, hub assembly and drive gear are removed from the bicycle frame without manipulation of the chain.

The foregoing has outlined rather generally the features and technical advantages of one or more embodiments of this disclosure in order that the following detailed description may be better understood. Additional features and advantages of this disclosure will be described below.

BRIEF DESCRIPTION OF THE DRAWINGS

This disclosure is further described in the detailed description that follows, with reference to the drawings in which.

DETAILED DESCRIPTION

This application discloses a preferred logical third axle gear train 100 that may be utilized on a bicycle or other gear driven apparatus to facilitate removal of a wheel. Because the disclosed gear train separates the rear drive sprocket from the bicycle hub assembly, manipulation/removal of the drive chain is unnecessary when removing the rear drive wheel of the bicycle.

Figure 1:
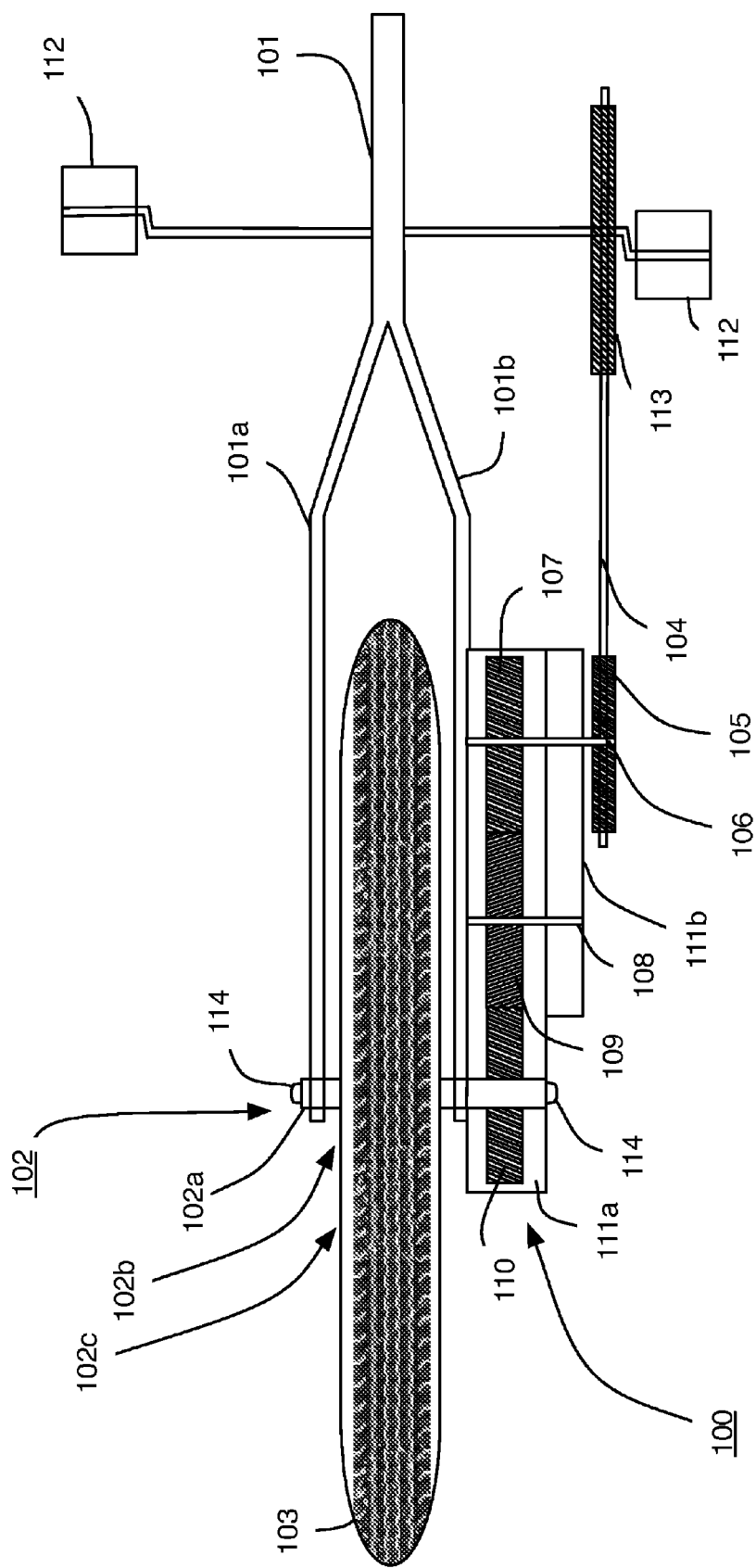
FIG. 1 is a top plan view of a logical third axle bicycle gear train mounted on the rear section of an illustrative bicycle.

FIG. 1 illustrates a preferred logical third axle bicycle gear train 100 mounted on the rear section of an illustrative bicycle. Bicycle frame "chain-stays" 101a and 101b may extend from the rear of a bicycle frame 101. Bicycle hub assembly 102 may include any bicycle hub type as desired by the end user, including free-hub types, free-wheel types, track sprockets or internally geared hubs. Bicycle hub assembly 102 may be a conventional bicycle hub, which typically includes at least a fixed axle 102a and an outer hub shell 102b that rotatably glides on internal bearings 102c. Hub assembly 102 may be mounted on the frame 101 at the rear chain-stays 101a and 101b, providing physical support and a rotational axis for rear bicycle drive wheel 103. Bicycle hub assembly 102 may be secured to chain stays 101a and 101b via fasteners 114, which may be, for example, quick release clamps or traditional fastening nuts. Bicycle wheel 103 (e.g., spokes, rim and tire) is operatively connected to and supported by bicycle hub assembly 102.

Drive chain 104 may operatively connect a drive sprocket 105 to a crank sprocket 113 to transmit torque from the bicycle pedal assembly 112 to the drive sprocket 105. Drive sprocket 105 may be a single sprocket (as in a single-speed bicycle) or a sprocket set (as in a multi-speed bicycle), and is preferably mounted on a longitudinal axle 106, which is rotatably mounted to the bicycle frame 101. Power gear 107 is preferably also mounted on the longitudinal axle 106 so that rotation of drive sprocket 105 causes power gear 107 to rotate as well. Thus, when drive sprocket 105 receives torque from drive chain 104, torque is transmitted to power gear 107 through longitudinal axle 106. It is understood that other types of drive mechanisms may be substituted for the drive chain 104 and drive sprocket 105, such as, for example, a drive belt and drive pulley.

A conversion gear 109 is preferably used to transmit torque from power gear 107 to a drive gear 110 that is operatively connected to the bicycle hub assembly 102. Power gear 107, conversion gear 109 and drive gear 110 are preferably round or cylindrical shaped gears having a plurality of teeth on their outer peripheries for mechanical (meshing) engagement with corresponding teeth on adjacent gears. Power gear 107, conversion gear 109 and drive gear 110 are preferably made from steel or aluminum, but may be made from any other suitable material such as plastic or titanium. Power gear 107, conversion gear 109, and drive gear 110 may be of different diameters should it be desired to adjust the gear ratio.

Conversion gear 109 may be used to transmit torque from power gear 107 to drive gear 110, and correct the rotational direction of drive gear 110. Conversion gear 109 is preferably mounted on longitudinal axle 108, which is preferably rotatably mounted on chain-stay 101b of frame 101. While only one conversion gear 109 is illustrated in the drawings, it is understood that a series of conversion gears may be utilized between the power gear 107 and drive gear 110 to transmit torque to and maintain the desired rotation of the drive gear.

Drive gear 110 may be used to transmit torque to rear drive wheel 103 by receiving torque from power gear 107 through conversion gear 109. Drive gear 110 is preferably mounted on or otherwise operatively connected to bicycle hub assembly 102, which is, in turn, operatively connected to removable bicycle drive wheel 103 (rim, spokes and tire). Torque received by drive gear 110 is transmitted through the hub assembly 102 to bicycle drive wheel 103, propelling the bicycle forward.

A protective gear cover 111a and gear housing 111b are preferably mounted on the chain-stay 101b of frame 101. The protective cover 111a at least partially encloses drive gear 110, conversion gear 109 and power gear 107. Gear housing 111b at least partially encloses power gear 107 and conversion gear 109, and supports axles 106 and 108. Gear cover 111a and housing 111b preferably protect power gear 107, conversion gear 109 and drive gear 110 from debris. Gear cover 111a and housing 111b are preferably made of any suitable material such as aluminum, steel or plastic. Gear cover 111a and housing 111b may be formed as a unitary assembly or as separate components, and are preferably removably mounted on chain-stay 101b of bicycle frame 101 to enable servicing of the logical third axle gear train.

Figure 2:
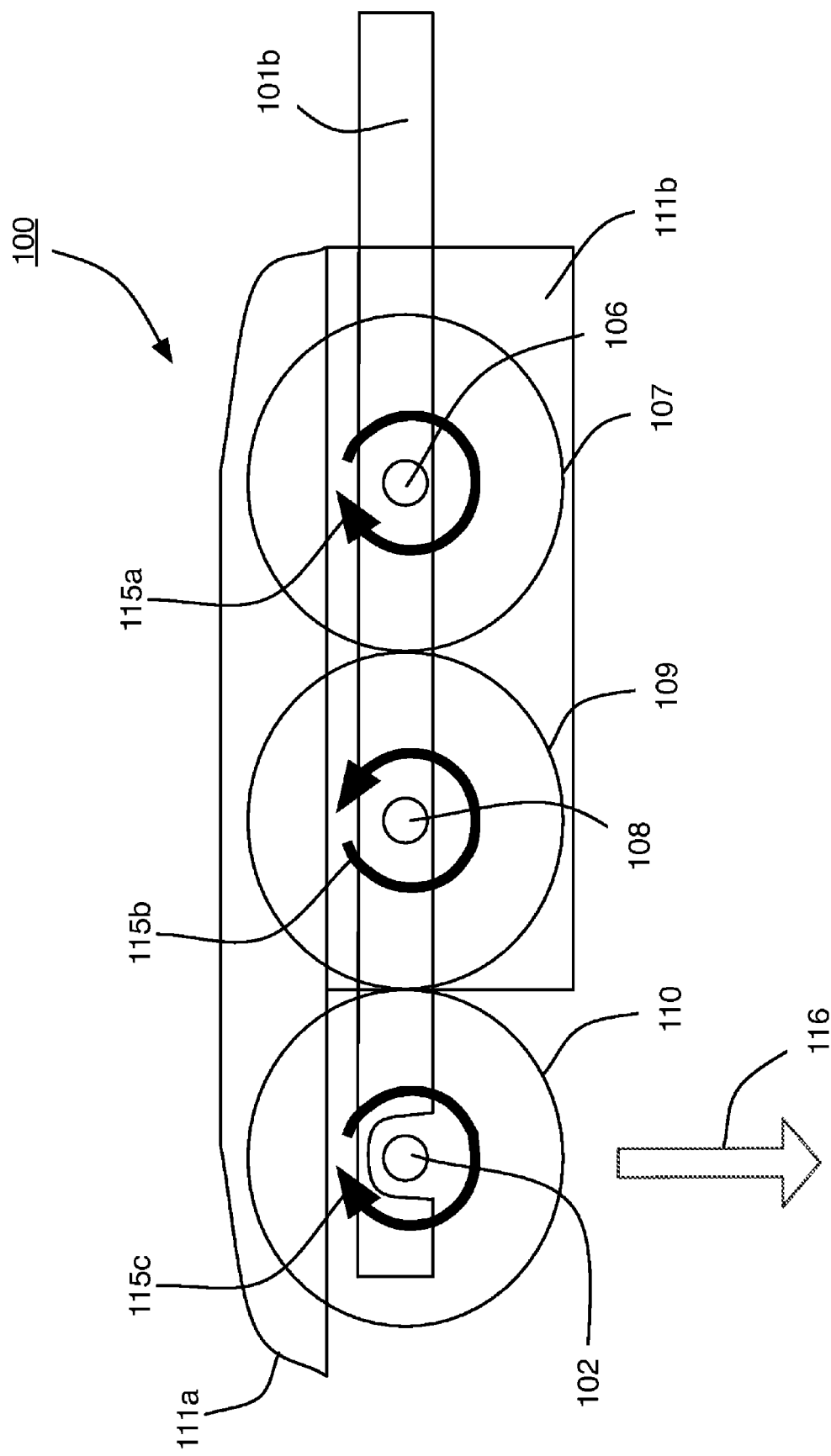
FIG. 2 is a side elevational view of the logical third axle bicycle gear train of FIG. 1.

FIG. 2 is a side elevational view of the preferred logical third axle bicycle gear train 100 mounted on the rear section of the bicycle frame 101. Power gear 107 may receive torque from a drive sprocket 105 (shown in FIG. 1) via longitudinal axle 106, as described above. Torque may be transmitted from power gear 107 to drive gear 110 through one or more conversion gears 109.

Conversion gear 109 transmits torque from power gear 107 to drive gear 110, and corrects the rotational direction of drive gear 110. Conversion gear 109 may be mounted on longitudinal axle 108, which may provide support and an axis for rotation. Longitudinal axles 106 and 108 are preferably rotatably supported by chain-stay 101b of frame 101 and gear housing 111b. Axles 106 and 108 may be mounted on bearings or journals to permit rotation relative to chain-stay 101b of frame 101 and gear housing 111b.

Power gear 107 is illustrated rotating in a clockwise direction 115a, consistent with the direction of pedaling associated with forward motion on a bicycle. In contrast to conventional bicycles, drive sprocket 105 is not mounted on the same axle as the rear drive wheel 103, which thereby facilitates removal of the rear drive wheel 103 without manipulation of the drive chain 104. This, in turn, requires transmission of mechanical torque to the bicycle hub assembly 102 upon which rear drive wheel 103 is supported. Because adjacent gears typically rotate in opposite directions when engaged, the rotation of power gear 107 in clockwise direction 115a will cause an adjacent gear to rotate in a counter-clockwise direction 115b. Counter-clockwise rotation 115b may be unsuitable for propelling a bicycle forward as it is generally associated with a reverse or backwards direction of travel. Conversion gear 109 transmits torque from power gear 107 and serves as an intermediary to correct the direction of rotation of the drive gear 110 to clockwise rotation 115c.

Drive gear 110 may be used to transmit torque to a drive wheel 103 by receiving torque from power gear 107 through conversion gear 109. Drive gear 110 is preferably mounted on or is otherwise operatively connected to hub assembly 102 in a conventional manner. Bicycle hub assembly 102 is preferably a conventional bicycle hub, which typically includes at least a fixed axle 102a and an outer hub shell 102c that rotates about the fixed axle on internal bearings 102b. Bicycle hub assembly 102 is operatively connected to both the drive gear 110 and drive wheel 103. Torque received by drive gear 110 is transmitted through the hub assembly 102 to the drive wheel 103, propelling the bicycle forward.

The protective gear cover 111a is shown at least partially enclosing drive gear 110, conversion gear 109 and power gear 107. The gear housing 111b is also shown at least partially enclosing power gear 107 and conversion gear 109, and rotatably supporting longitudinal axles 106 and 108.

Removal of rear bicycle wheel 103 may be effectuated without manipulating drive chain 104. Once the fasteners 114 (e.g., quick release clamps or fastening nuts) are removed from hub assembly 102, rear bicycle wheel 103, bicycle hub assembly 102 and drive gear 110 preferably slide away from chain stay arms 101a and 101b, which are preferably equipped with bicycle drop-outs for easy removal. In the preferred embodiment, the wheel 103 being removed slides out of the drop-outs in a generally downward direction 116, thereby negating any need to manipulate protective cover 111a or gear housing 111b to gain the required clearance for drive gear 110. In an alternative embodiment, manipulation of the protective cover 111a or gear housing 111b may be required depending on the slotting of the drop-out mechanism.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A logical third axle gear train for a bicycle, comprising:
   a power gear operatively connected to at least one sprocket and adapted to be rotatably mounted on a bicycle frame, the at least one sprocket being connected to a pedal assembly on the bicycle frame by a chain;
   a drive gear operatively connected to a hub assembly on which a drive wheel is mounted; and
   a conversion gear adapted to be rotatably mounted on the bicycle frame, the conversion gear disposed between the power gear and drive gear to transmit torque from the power gear to drive gear, wherein the drive wheel is removable from the bicycle frame without manipulation of the chain for driving the sprocket.

2. The logical third axle gear train of claim 1, wherein the hub assembly comprises an outer hub that rotates on a first axle that is adapted to be releasably mounted on the bicycle frame.

3. The logical third axle gear train of claim 1, wherein the power gear and at least one sprocket are mounted on a second axle that is rotatably supported by the bicycle frame.

4. The logical third axle gear train of claim 3, wherein the conversion gear is mounted on a third axle that is rotatably supported by the bicycle frame.

5. The logical third axle gear train of claim 4, further comprising a gear housing that at least partially encloses the drive gear and conversion gear, the gear housing rotatably supporting the second and third axles.

6. The logical third axle gear train of claim 1, further comprising a cover that at least partially encloses the power gear, drive gear and conversion gear.

7. The logical third axle gear train of claim 1, wherein the at least one sprocket is a sprocket set including sprockets of different diameters to enable multi-speed functionality for the bicycle.

8. A bicycle having a logical third axle gear train, comprising:
   a bicycle frame;
   a drive gear operatively connected to a hub assembly on which a drive wheel is mounted, the hub assembly being releasably attached to the bicycle frame;
   a power gear rotatably mounted on the bicycle frame and operatively connected to at least one sprocket driven by a chain; and
   a conversion gear disposed between the power gear and drive gear, wherein the drive wheel, hub assembly and power gear are removable from the bicycle frame without manipulation of the chain.

9. The bicycle of claim 8, wherein the hub assembly comprises an outer hub that rotates on a first axle that is releasably attached to the bicycle frame.

10. The bicycle of claim 8, wherein the power gear and at least one sprocket are mounted on a second axle that is rotatably supported by the bicycle frame.

11. The bicycle of claim 10, wherein the conversion gear is mounted on a third axle that is rotatably supported by the bicycle frame.

12. The bicycle of claim 11, further comprising a gear housing mounted on the bicycle frame that at least partially encloses the drive gear and conversion gear, the gear housing rotatably supporting the second and third axles.

13. The bicycle of claim 8, further comprising a cover that at least partially encloses the power gear, drive gear and conversion gear.

14. The bicycle of claim 8, further comprising a pedal assembly mounted on the bicycle frame, wherein the at least one sprocket is operatively connected to a pedal assembly by the chain.

15. The bicycle of claim 14, wherein the at least one sprocket is a sprocket set including sprockets of different diameters to enable multi-speed functionality for the bicycle.

16. A method of removing a bicycle wheel from a bicycle frame, comprising:
   rotatably mounting a power gear on the bicycle frame and operatively connecting the power gear to at least one sprocket driven by a chain;
   operatively connecting a drive gear to a hub assembly on which the bicycle wheel is mounted, the hub assembly being releasably mounted on the bicycle frame;
   rotatably mounting a conversion gear on the bicycle frame between the power gear and drive gear for transmitting torque from the power gear to drive gear; and
   removing the drive wheel, hub assembly and drive gear from the bicycle frame without manipulation of the chain.

\* \* \* \* \*